US010212887B2

(12) United States Patent
Ramer et al.

(10) Patent No.: US 10,212,887 B2
(45) Date of Patent: *Feb. 26, 2019

(54) BALE MOVER WITH SELF-ADJUSTING SPINNERS

(71) Applicant: Harper Industries, Inc., Harper, KS (US)

(72) Inventors: Heber M. Ramer, Harper, KS (US); Ross Milton Bender, Conway Springs, KS (US); Mark Kiner, Perry, OK (US)

(73) Assignee: Harper Industries, Inc., Harper, KS (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/180,600

(22) Filed: Jun. 13, 2016

(65) Prior Publication Data
US 2016/0295801 A1 Oct. 13, 2016

Related U.S. Application Data

(63) Continuation-in-part of application No. 14/304,254, filed on Jun. 13, 2014, now Pat. No. 9,363,947.

(51) Int. Cl.
*A01D 87/12* (2006.01)
*A01D 87/00* (2006.01)
*A01D 90/08* (2006.01)

(52) U.S. Cl.
CPC .......... *A01D 90/08* (2013.01); *A01D 87/127* (2013.01); *A01D 2087/128* (2013.01)

(58) Field of Classification Search
CPC .......... A01D 2087/128; A01D 87/127; A01D 90/083; A01D 87/122; Y10S 414/124; Y10S 294/902; B60P 1/483

USPC .............. 172/19, 20; 242/399.1, 403, 578.2, 242/578.3; 294/106, 81.4, 81.61, 206, 294/107; 414/111, 24.5, 24.6, 546, 558, 414/619, 911

See application file for complete search history.

(56) References Cited

U.S. PATENT DOCUMENTS

| 221,395 | A | | 11/1879 | Cass |
| 290,020 | A | | 12/1883 | Fisk |
| 911,684 | A | | 2/1909 | Shields et al. |
| 1,033,906 | A | | 7/1912 | Kennedy |
| 1,807,360 | A | | 5/1931 | Wehr |
| 1,884,861 | A | * | 10/1932 | Remde .................... B60L 11/18 414/619 |
| 2,915,332 | A | | 12/1959 | Cotesworth et al. |

(Continued)

*Primary Examiner* — Gregory W Adams
(74) *Attorney, Agent, or Firm* — Erickson Kernell IP, LLC; Kent R. Erickson

(57) ABSTRACT

A bale mover with self-adjusting spinners for loading/unloading bales and unrolling bales. The bale mover includes a cross member and a pair of opposing arms that extend generally orthogonally to the cross member. The cross member is pivotable about an axis extending transverse to the bale mover to move the arms to extend away from the bale mover. The arms are moveable toward one another to pinch a bale between distal ends thereof. A spinner is provided at the distal end of each arm. The spinners include axles secured to the arms and spinner bodies which are rotatable about the respective axles to facilitate rotation of a bale engaged by the spinners. The spinners are also pivotable relative to the axles to enable alignment of the spinners with surfaces of the bale.

11 Claims, 6 Drawing Sheets

(56) References Cited

U.S. PATENT DOCUMENTS

| | | | | |
|---|---|---|---|---|
| 3,103,282 | A | 9/1963 | York | |
| 3,273,931 | A | 9/1966 | Caldwell et al. | |
| 3,880,305 | A * | 4/1975 | Van Polen | A01D 87/127 242/557 |
| 3,908,846 | A | 9/1975 | Brummitt | |
| 3,946,887 | A | 3/1976 | Parker | |
| 3,997,069 | A | 12/1976 | McCanse et al. | |
| 4,024,970 | A | 5/1977 | Schirer | |
| 4,049,140 | A | 9/1977 | Roose | |
| 4,051,966 | A * | 10/1977 | Cotton | B66F 9/183 294/119.1 |
| 4,090,624 | A | 5/1978 | Krein et al. | |
| 4,095,706 | A | 6/1978 | Schwien et al. | |
| 4,254,984 | A * | 3/1981 | Abraham | B66C 1/447 294/206 |
| 4,280,777 | A | 7/1981 | Gray | |
| 4,305,692 | A * | 12/1981 | Brauer | B22D 33/00 164/137 |
| 4,336,962 | A | 6/1982 | Read | |
| 4,564,325 | A | 1/1986 | Ackerman | |
| 4,578,008 | A | 3/1986 | Gleason | |
| 4,595,333 | A * | 6/1986 | Ono | B25J 19/063 294/106 |
| 4,687,402 | A | 8/1987 | Zatylny | |
| 5,163,727 | A | 11/1992 | Slezak et al. | |
| 5,281,068 | A | 1/1994 | Bruce | |
| 5,509,770 | A | 4/1996 | Burenga | |
| 5,662,449 | A | 9/1997 | Krinhop | |
| 5,895,197 | A | 4/1999 | McVaugh | |
| 5,938,392 | A | 8/1999 | Duck | |
| 5,975,824 | A * | 11/1999 | Hostetler | B60P 1/483 298/1 A |
| 5,988,555 | A | 11/1999 | Unruh et al. | |
| 6,099,227 | A * | 8/2000 | Shellhammer | A01D 87/122 414/24.5 |
| 6,099,228 | A | 8/2000 | Krogmann | |
| 9,363,947 | B2 * | 6/2016 | Ramer | A01D 87/127 |
| 2012/0034059 | A1 | 2/2012 | Hedley et al. | |

* cited by examiner

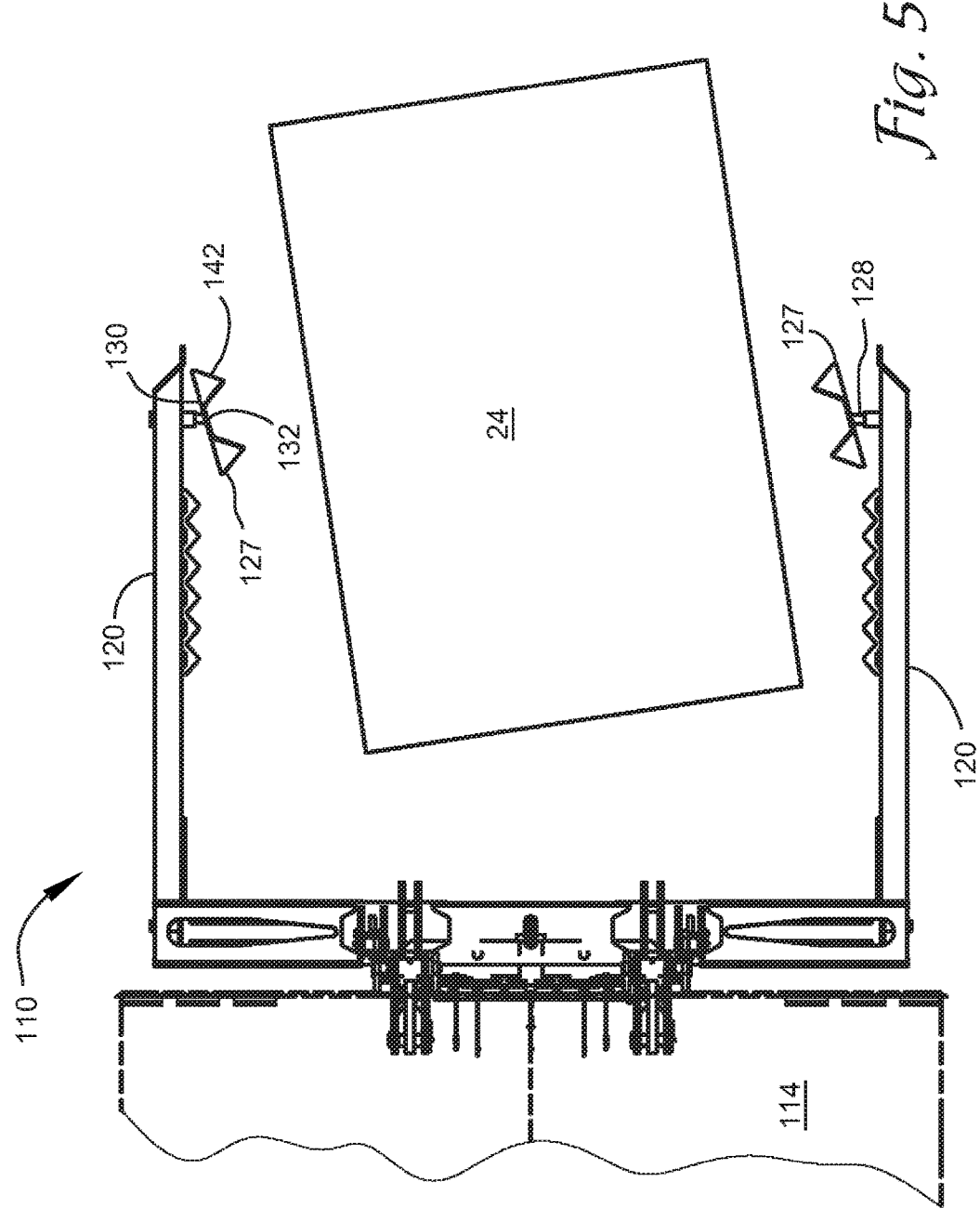

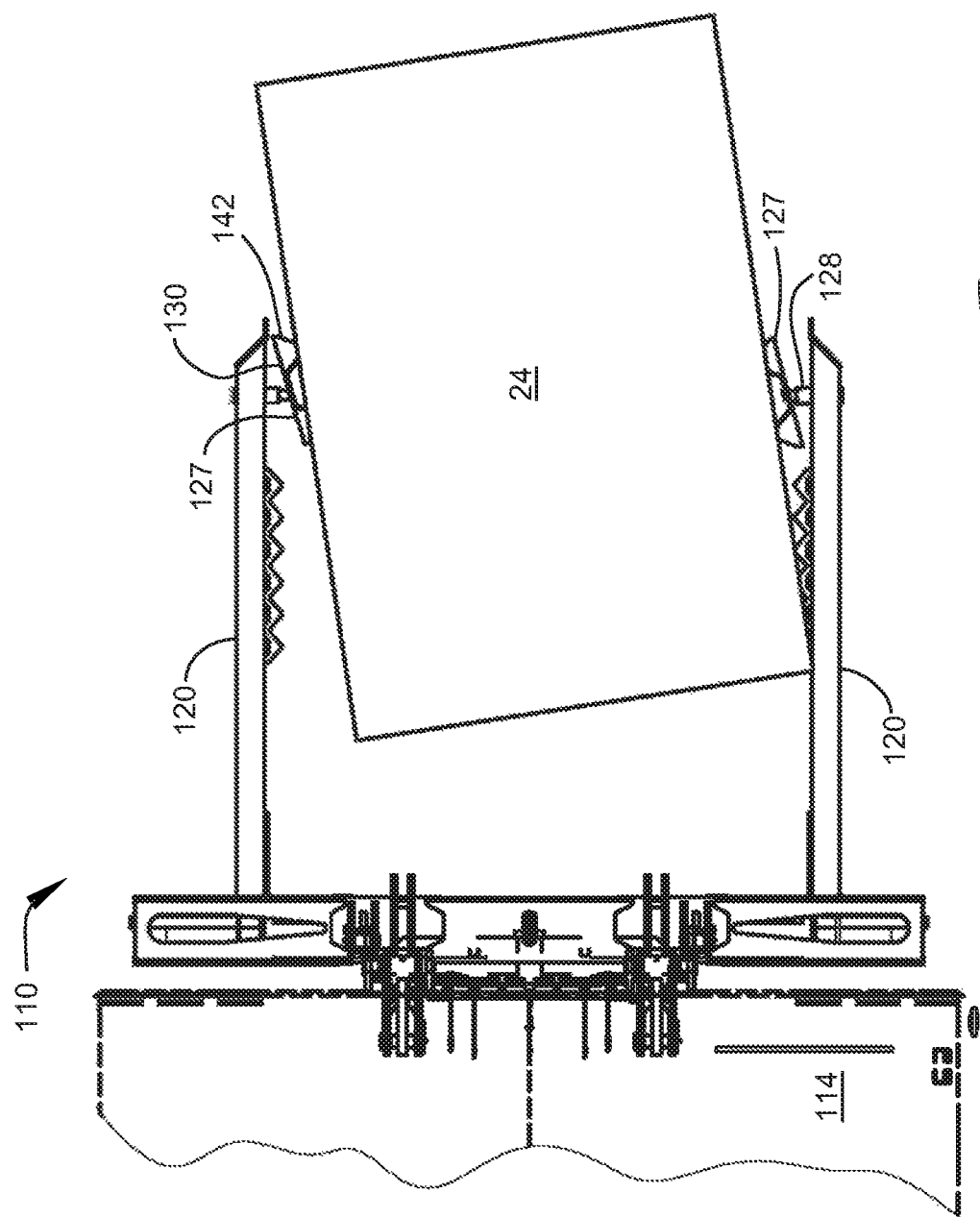

BALE MOVER WITH SELF-ADJUSTING SPINNERS

CROSS-REFERENCE TO RELATED APPLICATIONS

This application is a continuation-in-part of U.S. patent application Ser. No. 14/304,254, filed Jun. 13, 2014, now U.S. Pat. No. 9,363,947, the disclosure of which is hereby incorporated herein in its entirety by reference.

FIELD OF THE INVENTION

This invention relates to bale handling equipment for moving large round bales of hay, and in particular to a bale mover having gripping arms with self-adjusting spinners.

BACKGROUND

Bale movers of various configurations are well known in the art. For example, U.S. Pat. No. 4,564,325 to Ackerman describes a bale-lifting device for use with flat-bed trucks. The device includes a pair of arms that is pivotable longitudinally with respect to the length of the truck to move a bale onto the truck bed or to lower the bale from the bed to the ground. The arms are also pivotable transversely toward one another to pinch the bale therebetween for lifting. Attached to each of the arms is a respective spinner which extends inwardly from the respective arm toward a bale captured between the arms and which forms the primary point of contact between the arm and the bale. The spinners each include an axle rotatably mounted to the respective arm in an orientation perpendicular to the arm and a plate fixedly mounted to the axle in an orientation perpendicular to the arm. The plates bear against the end of the bale and hold the bale in a position to rotate about the axles. The spinners are used during unrolling of the bale for feeding and provide an axis of rotation for the bale.

A problem occurs if the spinners are not properly aligned with the axis of the bale during unrolling. This can cause the bale to not rotate properly and to bind or wobble during unrolling which results in the hay not being distributed evenly. Misalignment of the spinners with the bale is often due to the angle between the spinner axle and the respective arm not being correctly aligned with the bale.

U.S. Pat. No. 6,099,228 to Krogmann teaches that the spinners can be mounted at an oblique angle to the arms, the angle being selected to align the axis of the spinner with axis of the bale so that the bale will unroll effectively, and suggests that the preferred angle between the arm and the spinner axis is 130 degrees. This arrangement works reasonably well if the bales are of uniform axial length and if that length is appropriate for the bale mover.

Ranchers feeding hay, however, often encounter variation in the axial lengths of bales. This variation can be due to acquiring hay from different sources using different equipment to bale the hay or even due to weathering of the bales during storage. It would, therefore, be preferable to provide a bale moving apparatus with spinners that self-adjust to variations in the size of the bales to provide a proper axis of rotation for unrolling the bales, no matter the axial length of the bale.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a bale mover with self-adjusting spinners that self-align with ends of a hay bale.

The bale mover includes a base frame disposed on a flatbed truck. A cross-member is coupled along a rear end of the base frame and is pivotable about an axis that is transverse to the truck. The cross-member may also be moveable vertically to raise and lower the cross-member relative to the vehicle. An arm is mounted on each end of the cross-member and is moveable toward and away from the centerline of the truck. A spinner is disposed proximate the distal end of each arm and includes a spinner axle oriented in a fixed orientation relative to the arm and a spinner body pivotably mounted on the axle. The spinner is configured to pivot relative to the axle to align with the respective end of a bale when brought into contact therewith. The spinner also includes one or more bale gripping features extending from the spinner body that pierce the bale to aid gripping and lifting of the bale.

DESCRIPTION OF THE DRAWINGS

Illustrative embodiments of the invention are described in detail below with reference to the attached drawing figures, and wherein:

FIG. 5 is a top plan view of a bale mover with translationally movable arms depicted with the arms positioned on opposite sides of a misaligned bale in accordance with an embodiment of the invention; and FIG. 6 is a top plan view of the bale mover of FIG. 5 depicted with the arms moved inward to engage spinners on the arms with the misaligned bale in accordance with an embodiment of the invention.

DETAILED DESCRIPTION

Figure 1:
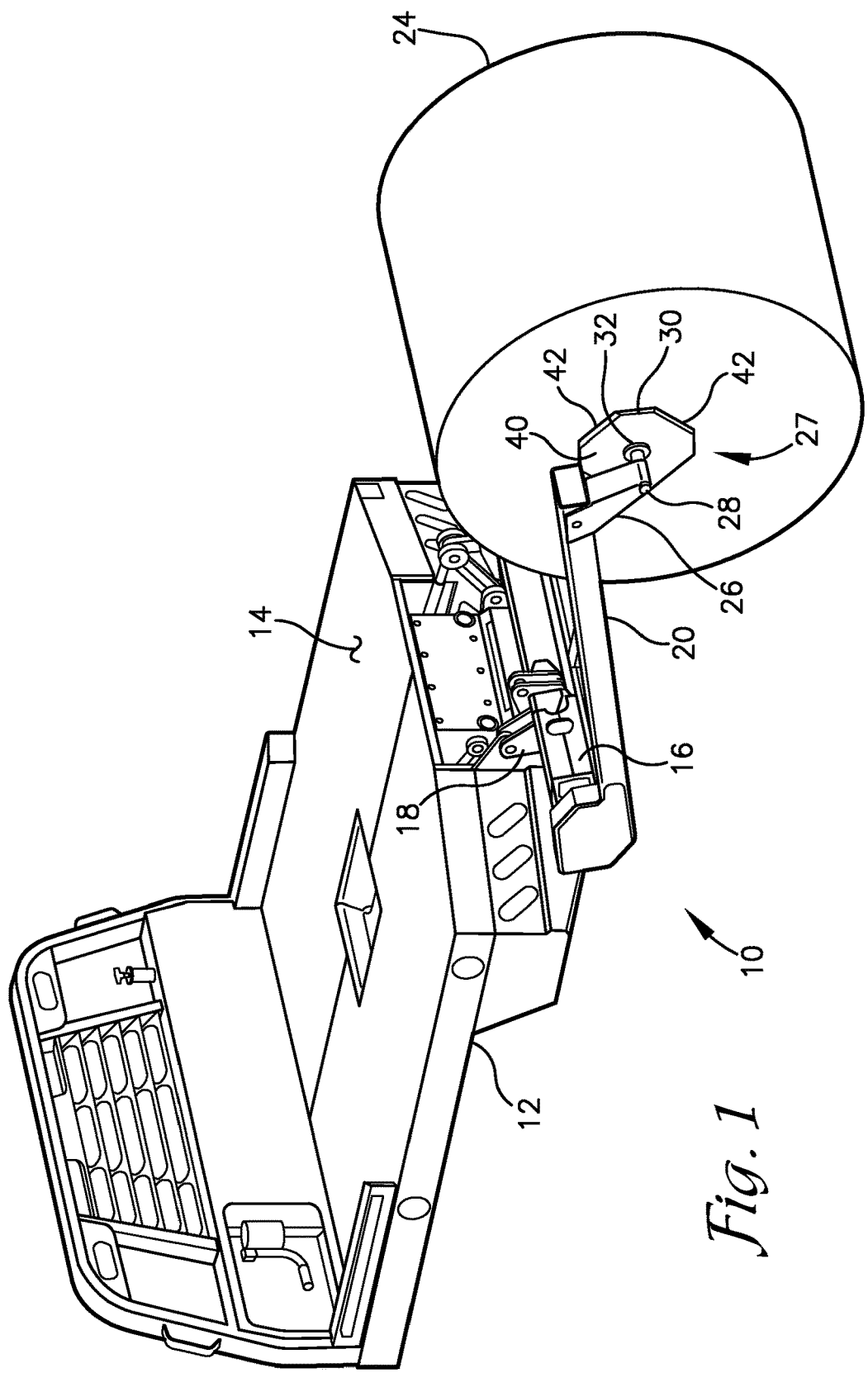
FIG. 1 is a perspective view of a bale mover engaged with an unloaded bale depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

With reference to FIGS. 1-4, a bale mover 10 is described in accordance with an embodiment of the invention. The bale mover 10 is depicted and described herein as being a flatbed-type bale mover for mounting to the frame of a truck (not shown). However it is to be understood that the invention is not limited to a particular type of bale mover and it is foreseen that elements of the invention can be incorporated into other types or styles of bale handling equipment. For example, the self-adjusting spinners to be described below can be used with tractor-mounted hay handling equipment or with bale movers designed for mounting in the bed of a pick-up truck. Additionally, the bale mover 10 is described with respect to loading/unloading and spreading of cylindrical or round bales, but other types of bales might be moved or spread by the bale mover 10 without departing from the scope of embodiments of the invention described herein.

The bale mover 10 is generally mounted on a base unit 12 configured for mounting on the frame or in the bed of a truck. The base unit 12 includes a generally flat loading surface 14 and a horizontal cross-member 16 moveably mounted along a rear end thereof. The cross-member 16 is typically connected to the base frame 12 by an articulated linkage 18. The linkage 18 allows the cross-member 16 to rotate about a horizontal axis and may also allow for vertical displacement of the cross-member 16.

Movement and actuation of the linkage 18 and cross-member 16 is preferably provided by one or more hydraulic actuators (not shown) but pneumatic, mechanical, electrical, or other apparatus can be used. Controls for operation of the actuators may be provided inside the cab of the vehicle and/or located on, for example, the base frame 12 of the bale mover 10. Remote control systems might also be employed.

An arm 20 is pivotally attached to each end of the cross-member 14. Actuators 22 disposed in the cross-member 16 couple to the arms 20 and are configured to pivot distal ends of the arms 20 toward and away from one another for engaging and disengaging a bale 24 therebetween. As depicted in FIGS. 5 and 6, another embodiment a bale mover 110 includes arms 120 that are not pivotable, but rather are moveable translationally toward and away from one another to engage the bale 24. U.S. Pat. No. 4,594,041 to Hostetler describes an exemplary configuration useable to translationally move the arms 120 toward/away from one another; the disclosure provided by the '041 patent with respect to such an exemplary translationally movable configuration is incorporated herein by reference.

A riser 26 is disposed at or near the distal end of each arm 20 and carries a spinner 27 having a spinner axle 28 upon which a spinner body 30 is mounted. The riser 26 displaces the spinner 27 laterally away from the arm 20 a sufficient distance to enable the arm 20 to assume a stowed position in which the arm 20 rests on the loading surface 14, e.g. without the spinner body 30 obstructing the arm 20 from achieving the stowed position. The riser 26, and thus the spinner 27 may be removable from the arm 20 when desired, such as when the vehicle carrying the bale mover 10 is not in use for unrolling bales 24. In another embodiment (not shown), the axle 28 may be coupled to the arm 20 directly without the use of the riser 26.

The axle 28 is rotatably coupled to the riser 26 via one or more bushings, bearings, or the like and has a fixed orientation relative to the arm 20—preferably perpendicular to the arm 20 and extending toward the opposite arm 20, however other orientations might be employed. In another embodiment, the axle 28 is fixedly coupled, e.g. not rotatably coupled, to the riser 26. The axle 28 includes a sharpened or pointed end to aid insertion thereof at least partially into ends of the bale 24. The axle 28 might alternatively have a blunt end or another desired configuration.

The spinner body 30 is rotatably and pivotably mounted on the axle 28 via a coupler 32 to enable the spinner body 30 to rotate relative to the axle 28 about an axis 34 extending parallel to the length of the axle 28 and to pivot relative to the axis 34; pivoting of the spinner body 30 relative to the axis 34 also pivots a rotational axis 35 of the spinner body 30 away from the axis 34. The coupler 32 comprises a ball-swivel, ball-and-socket, or heim-joint style coupling between the spinner body 30 and the axle 28, but may take other forms without departing from the scope of embodiments of the invention described herein.

Figure 4:
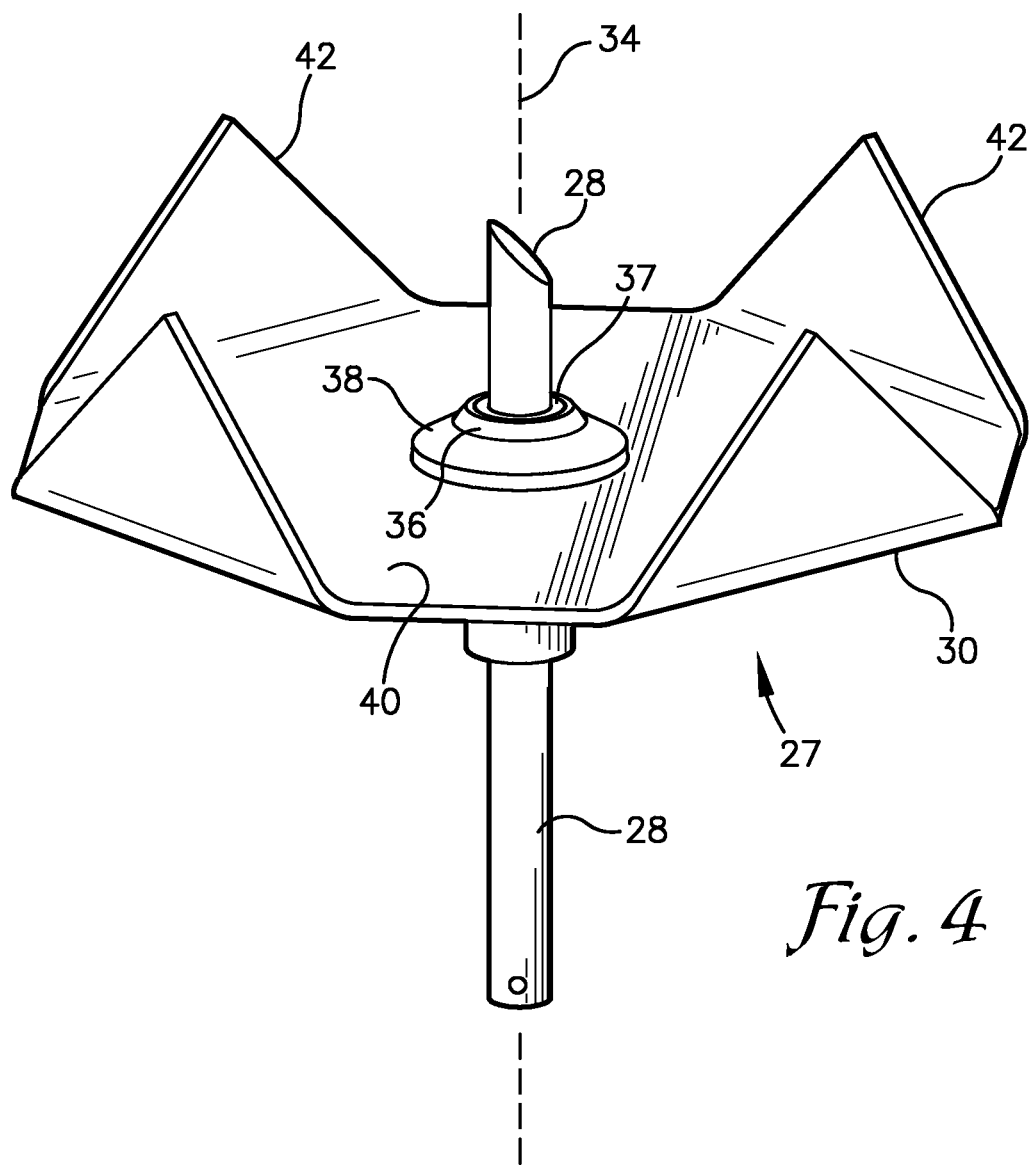
FIG. 4 is an enlarged view of a spinner rotatably and pivotably mounted on an arm of the bale mover of FIG. 3.

As shown in FIG. 4, the coupler 32 includes a ball-swivel 36 disposed in a casing 38. The ball-swivel 36 includes an aperture extending therethrough in which the axle 28 is received. A bushing or bearing 37 can be provided between the ball-swivel 36 and the axle 28 to facilitate relative rotational motion therebetween. An exterior of the casing 38 is affixed to the spinner body 30 while an interior of the casing 38 receives and retains engagement with the ball-swivel 36. The engagement between the ball-swivel 36 and the casing 38 is configured to enable rotation of the ball-swivel 36 within the casing 38 in any angular direction. Such rotation may only be limited by interaction between the axle 28 and the casing 38 when the coupler 32 is disposed thereon. One or more lubricants or bushings might be provided between the ball-swivel 36 and the casing 38. A dust-shield (not shown) might also be mounted over the coupler to prevent debris from entering between the ball-swivel 36 and the casing 38.

As indicated previously, the spinner 27 includes a body 30 comprising a generally planar center section 40 and a plurality of gripping elements 42. The center section 40 can take any form, but typically extends radially outward from the coupler 32 to provide a circular or polygonal plate. The gripping elements 42 extend outwardly from the spinner body 30 in a direction generally perpendicular to the center section 40 and toward the opposite arm 20 so as to be engageable with ends of the bale 24. The gripping elements 42 may comprise flanges, fingers, pins, plates, teeth, rods, or other features configured to at least partially penetrate the ends of the bale 24 when engaged therewith. Engagement of the gripping elements 42 with the bale 24 should provide sufficient resistance to movement of the bale 24 relative to the spinner 27 to enable lifting and loading/unloading of the bale 24 on the loading surface 14.

The body 30 of the spinner 27 is disposed along the length of the axle 28 such that a portion of the axle 28 extends beyond the body 30 of the spinner 27. Accordingly, the axle 28 may also at least partially penetrate and engage the bale 24. In another embodiment (not shown), the spinner 30 is disposed at the distal end of the axle 28. It is also foreseen that a centrally located point or spear similar to the distal end of the axle 28 (as shown) could form a part of the spinner body 30 and rotate and swivel therewith rather than being integral with the axle 28.

Figure 2:
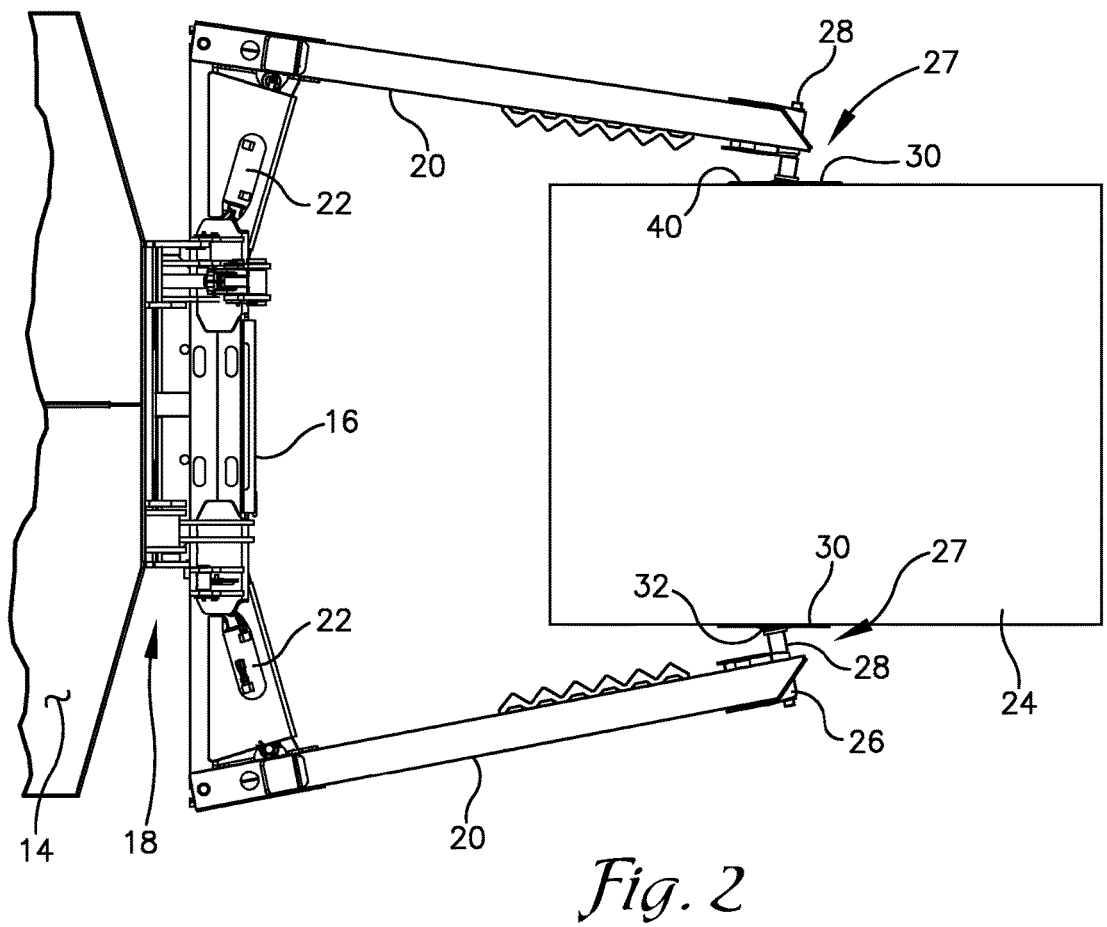
FIG. 2 is a top plan view of the bale mover of FIG. 1.
Figure 3:
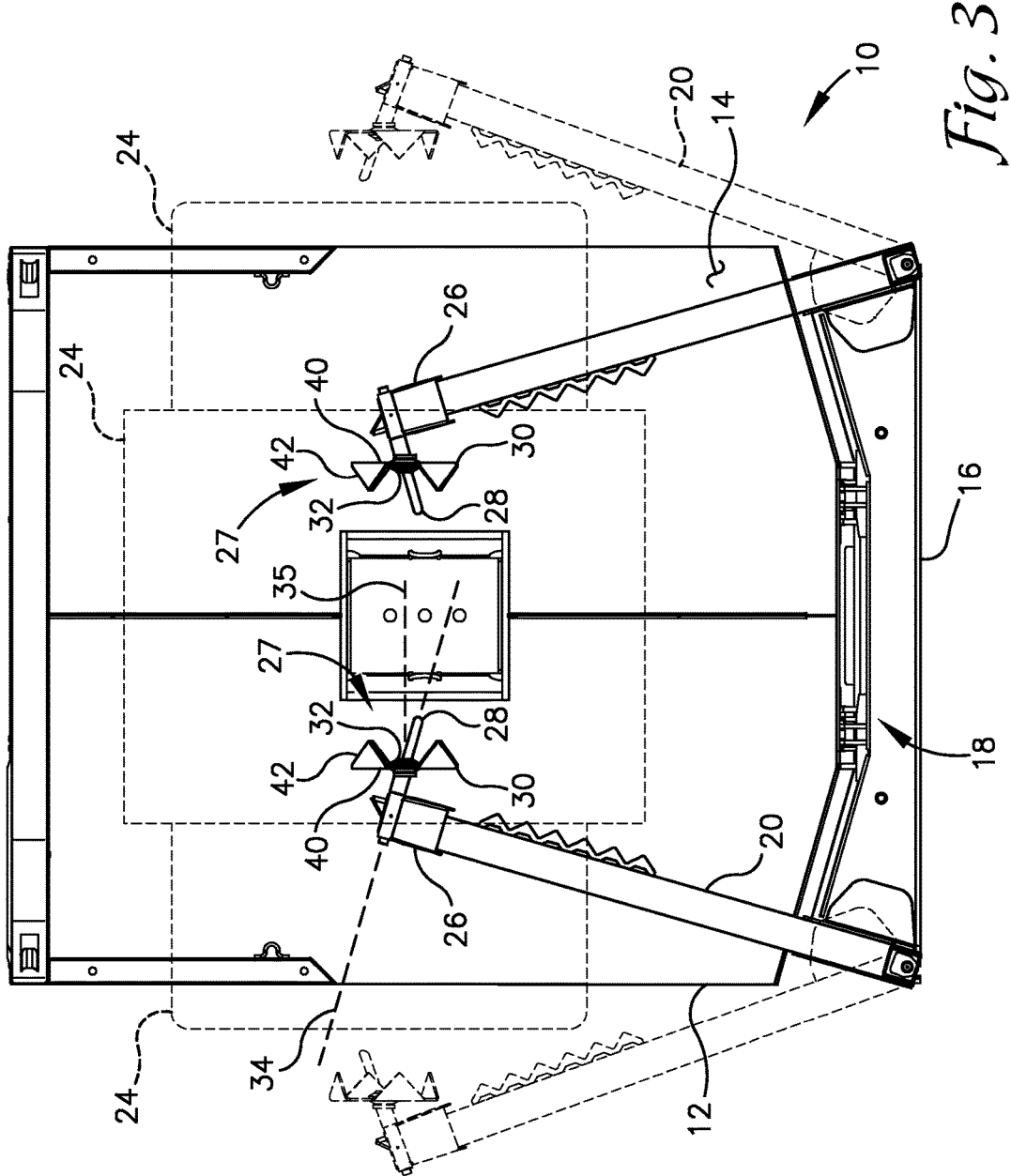
FIG. 3 is a top plan view of the bale mover of FIG. 1 depicting a range of motion of the arms in accordance with an embodiment of the invention.

With continued reference to FIGS. 1-4, operation of the bale mover 10 is described in accordance with an embodiment of the invention. Operation of the bale mover 10 is described with respect to loading of the bale 24 onto the loading surface 14; unloading of the bale 24 follows the reverse process. Initially, the vehicle carrying the bale mover 10 is driven to position the bale mover 10 adjacent to the bale 24 to be lifted, e.g. the vehicle is backed up to the bale 24 to position the cross-member 16 a distance from the bale 24. The cross-member 16 is actuated via the linkage 18 to move the arms 20 from a stowed position atop the loading surface 14 to a loading position extending rearward from the bale mover 10, as depicted in FIGS. 1-2. The arms 20 may be pivoted outwardly away from one another to provide sufficient spacing for receiving the bale 24 therebetween. The orientation of the cross-member 16 may be further adjusted via actuation of the linkage 18 to locate the spinners 27 generally centrally on the ends of the bale 24.

The arms 20 are pivoted toward one another to engage the spinners 27 with the ends of the bale 24. As the gripping elements 42 contact the ends of the bale 24 the spinner body 30 on each arm 20 pivots about the coupler 32 relative to the axle 28 to maintain the body 30 of the spinner 27 generally parallel to the ends of the bale 24. The gripping elements 42 are pressed against and/or at least partially into each end of the bale 24 to bring the central portion 40 of the spinner 27 into contact with the bale 24. The axles 28 may also pierce the ends of the bale 24.

The linkage 18 is again actuated to pivot the cross-member 16 and the arms 20 upwardly and toward the loading surface 14 to lift the bale 24 onto the loading surface 14.

Once the bale 24 is in a desired position and is resting on the loading surface 14 the arms 20 are pivoted away from one another to disengage the spinners 27 and the griping elements 42 from the bale 24. Depending on the size of the loading surface 14, one or more additional bales 24 can then be loaded as desired. The arms 20 might be maintained in engagement with the bale 24 to secure the bale 24 during transportation thereof.

Unloading of the bale 24 follows the reverse process. Additionally, it may be desirable to employ the bale mover 10 to aid spreading of the bale 24 on the ground for ease of consumption by livestock of for ground coverage. Accordingly, following unloading of the bale 24 onto the ground the arms 20 and spinners 30 may remain engaged with the bale 24. Any twine, netting, or other bindings on the bale 24 are removed manually. The vehicle carrying the bale mover 10 may then be driven while the bale 24 is engaged by the bale mover 10 to cause the bale 24 to be unrolled. The bale 24 is allowed to rotate via rotation of the spinner bodies 30 about the axles 28 and/or via rotation of the axles 28 within their couplings with the risers 26. The pivotal and rotational motion of the spinners 30, as enabled by the couplers 32, prevents binding of the components during unrolling of the bale 24. The pivotal and rotational motion of the spinner bodies 30 also maintains positive engagement with the bale 24 without wallowing out the ends of the bale 24 as might be encountered with a statically oriented engagement between the arms 20 and the bale 24. Such may be advantageous when it is desirable to load a remainder of the bale 24 onto the loading surface 14; if the ends of the bale 24 had been wallowed out, the engagement therewith may not be sufficient to support the bale 24 and may create dangerous conditions that could result in dropping of the bale 24, among other situations.

With reference to FIGS. 5 and 6, the bale mover 110 is operated similarly to the bale mover 10 for loading and unloading the bale 24, but the arms 120 are moved translationally toward/away from one another, e.g. the arms 120 are maintained in a generally parallel orientation. As described above, the vehicle carrying the bale mover 110 is driven to position the bale mover 110 adjacent to the bale 24 to be lifted. The arms 120 are moved from a stowed position atop the loading surface 114 to a loading position extending rearward from the bale mover 110, as depicted in FIG. 5. The arms 120 may be moved outwardly away from one another to provide sufficient spacing for receiving the bale 24 therebetween and the spinners 127 are located generally centrally on the ends of the bale 24.

The arms 120 are then moved toward one another to engage the spinners 127 with the ends of the bale 24, as depicted in FIG. 6. As the gripping elements 142 contact the ends of the bale 24, the spinner body 130 on each arm 120 pivots about the coupler 132 relative to the axle 128 to maintain the body 130 of the spinner 127 generally parallel to the ends of the bale 24. The bale mover 110 can then be actuated to raise the bale 24 onto the loading surface 114.

Pivoting of the spinner bodies 130 relative to the axles 128 aids engagement of the spinners 127 with the bale 24 when the bale 24 is not in alignment with the vehicle or the arms 120 and prevents the spinner bodies 130 from being broken, bent, or deformed when engaging a misaligned bale 24. For example, when the vehicle is not aligned with the bale 24 such that the arms 120 are not parallel to the end faces of the bale 24, the spinner bodies 130 can pivot to accommodate the misalignment, as shown in FIGS. 5 and 6. If the spinner bodies 130 were not pivotable, pressing of the spinner bodies 130 against the end faces of the bale 24 with sufficient force to lift the bale 24 may cause the spinner bodies 130 to shear away from the axles 28, to be bent or otherwise deformed, or to dig into and damage the end faces of the bale 24.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure is intended to demarcate those structures as including a plurality of possible arrangements or designs within the scope of this disclosure and readily identifiable by one of skill in the art to perform the particular function in a similar way without specifically listing all such arrangements or designs. Certain features and sub-combinations are of utility and may be employed without reference to other features and sub-combinations and are contemplated within the scope of the claims.

What is claimed is:

1. A bale-mover comprising:
   a base frame coupled to a vehicle;
   a pair of bale-lifting arms disposed proximate opposite sides of the base frame, each arm in the pair being moveable to move at least a distal end of the arm toward the distal end of the other arm in the pair;
   an axle disposed proximate the distal end of each arm and having a fixed orientation relative to the respective arm, each axle defining a respective axis of rotation;
   a spinner body disposed along the length of each axle, each spinner body rotatable about the respective axis of rotation and pivotable relative to the respective axle; and
   a coupler that couples the spinner body to the axle, the spinner body being rotatable relative to the respective axle about the respective axis of rotation and pivotable relative to the respective axle via the coupler.

2. The bale mover of claim 1, wherein the spinner further comprises:
   a gripping element extending outwardly from the spinner body substantially toward the opposing spinner body and configured to engage a bale.

3. The bale mover of claim 2, wherein the spinner body substantially aligns with ends of the bale when brought into contact therewith irrespective of an orientation of the axle relative to the ends of the bale.

4. The bale mover of claim 3, wherein the spinner bodies rotate about the axes of rotation defined by said axles while maintaining alignment with the ends of the bale to facilitate unrolling of a round bale.

5. The bale mover of claim 1, further comprising:
a cross-member disposed between proximate ends of the arms, the arms being coupled to opposing ends of the cross-member; and
a linkage pivotably coupling the cross-member to the base frame to pivot the cross-member about an axis extending substantially along the length of the cross-member.

6. The bale mover of claim 1, wherein the bale mover is mounted on a frame of a truck, in a bed of a truck, or on a tractor.

7. The bale mover of claim 1, wherein the axles are non-rotatably coupled to the respective arms.

8. A bale-mover comprising:
a base frame coupled to a frame of a truck, the truck having a substantially flat load bed;
a cross-member pivotably coupled along a rear end of the base frame via a linkage, the cross-member being pivotable about an axis extending substantially parallel to the length of the cross-member;
a pair of bale-lifting arms coupled proximate opposite ends of the cross-member, each arm in the pair being moveable toward a centerline of the truck, and being pivotable about the axis extending substantially parallel to the length of the cross-member from a position lying against the load bed to a position extending from a rear end of the truck;
a spinner axle that is non-rotatably coupled to each arm, the spinner axle having a fixed orientation relative to the respective arm and defining an axis of rotation; and
a spinner body disposed on each spinner axle and coupled to the spinner axle by a ball-swivel joint, the spinner rotatable relative to the spinner axle about the respective axis of rotation and pivotable relative to the respective spinner axle,
wherein the spinners bodies align with ends of a bale when engaged therewith and enable rotation of the bale about an axis extending between the spinners.

9. The bale mover of claim 8, further comprising:
a riser disposed between each spinner axle and a respective distal end of each arm and extending from the respective arm a distance D in a direction substantially orthogonal to the load bed when the arm is positioned to lie against the load bed and the distance D of the risers being greater than a radial dimension of the spinner body to enable the arms to lie flat against the load bed.

10. The bale-mover of claim 1, wherein the bale-lifting arms are translationally moveable toward one another to move the distal ends thereof toward one another.

11. The bale-mover of claim 1, wherein the bale-lifting arms are pivotable to move the distal ends thereof toward one another.

\* \* \* \* \*